United States Patent [19]
Schmolzer et al.

[11] 4,197,224
[45] Apr. 8, 1980

[54] BINDERS FOR CATHODICALLY DEPOSITABLE AQUEOUS COATING COMPOSITIONS EMPLOYING AN ELECTRODEPOSITION SYSTEM

[75] Inventors: Gerhard Schmölzer; Heiner Verdino, both of Graz, Austria

[73] Assignee: Vianova Kunstharz, A. G., Werndorf, Austria

[21] Appl. No.: 932,486

[22] Filed: Aug. 10, 1978

Related U.S. Application Data

[63] Continuation-in-part of Ser. No. 878,772, Feb. 17, 1978.

[30] Foreign Application Priority Data

Sep. 23, 1977 [AT] Austria .................................. 6816/77

[51] Int. Cl.$^2$ ..................... C09D 3/72; C09D 5/02; C09D 5/40
[52] U.S. Cl. ........................ 260/22 TN; 204/181 C; 260/29.2 TN; 260/29.2 E; 260/29.2 N; 260/29.2 EP
[58] Field of Search .......... 204/181 C; 260/29.2 TN, 260/29.2 E, 29.2 N, 29.2 EP, 22 TN

[56] References Cited

U.S. PATENT DOCUMENTS

| | | | |
|---|---|---|---|
| 3,679,564 | 7/1972 | Dowbenko et al. | 204/181 C |
| 3,882,188 | 5/1975 | Behmel | 260/29.4 R |
| 3,928,156 | 12/1975 | Wismer et al. | 204/181 C |
| 3,947,338 | 3/1976 | Jerabek et al. | 204/181 C |
| 3,971,708 | 7/1976 | Davis et al. | 204/181 C |
| 3,984,382 | 10/1976 | Parekh et al. | 526/15 |
| 4,001,101 | 1/1977 | Bosso et al. | 204/181 C |
| 4,036,795 | 7/1977 | Tominaga | 204/181 C |

FOREIGN PATENT DOCUMENTS

1411568 10/1975 United Kingdom ................ 204/181 C

OTHER PUBLICATIONS

J. A. Frump, Chemical Review, 1971, vol. 71, No. 5, pp. 483-505.

Primary Examiner—Ronald W. Griffin
Attorney, Agent, or Firm—A. W. Breiner

[57] ABSTRACT

Binders for cathodically depositable aqueous coating compositions comprising a basic binder system which is blend or partial reaction product of a basic macromolecular component and an acidic macromolecular component, the ratio between acid and basic binders as expressed by amine value and acid value ranges from 97:3 and 65:35, and included in the coating composition is at least one resin component modified with a compound of the general formula

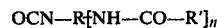

wherein:
n is 1-3;
R is an aliphatic hydrocarbon radical, or an aromatic or cycloaliphatic nucleus, preferably substituted with alkyl groups, and
R' is the moiety of a saturated or unsaturated alcohol; a phenol optionally substituted with alkyl radicals; a cyclic lactam; an aldoxime, a ketoxime; an acetoacetic acid ester, or a hydroxamic acid ester.

The coating compositions, in addition to providing excellent cross-linking at normal curing temperatures and providing films with enhanced resistance to corrosion, have improved throwing power.

17 Claims, No Drawings

BINDERS FOR CATHODICALLY DEPOSITABLE AQUEOUS COATING COMPOSITIONS EMPLOYING AN ELECTRODEPOSITION SYSTEM

This application is a continuation-in-part of application Ser. No. 878,772 filed Feb. 17, 1978.

The present invention is directed to improved coating compositions based on heat-hardenable binder systems which are water dilutable on partial or total neutralization of their basic groups with acids. These coating compositions are particularly suited for cathodic deposition in an electrodeposition coating process.

Co-pending application Ser. No. 878,772 filed Feb. 17, 1978 disclosed cathodically depositable water-dilutable coating compositions wherein a basic binder system is utilized which includes acid groups, the ratio between the basic and acid groups as reflected by the ratio of amine value to acid value, in mg KOH/g, ranges between 97:3 and 65:35. The acid and basic groups are either attached to the same macromolecule or to separate macromolecules in the basic binder system. The coating compositions optionally include pigments, dyestuffs, extenders, solvents, paint additives, and additional crosslinkers. The advantages provided by the acid groups in the basic coating compositions include better crosslinking density of the cured film and reduced curing temperatures of the coating in relation to basic binders without acid groups.

It has now been found that the properties of the coating compositions of application Ser. No. 878,772 can be further improved provided at least one of the components of the basic binder system is modified by a partially blocked polyisocyanate. Accordingly, the present invention is specifically directed to cathodically depositable water-dilutable coating compositions based on binder systems containing basic nitrogen groups and, in addition to the basic nitrogen groups, acid groups in a ratio as expressed by the ratio of amine value to acid value, in mg KOH/g, ranging between 97:3 and 65:35, and there is present in the coating composition at least one resin component which is modified with a compound of the general formula OCN—R[NH—CO—R']$_n$ wherein:
n is 1-3;
R is an aliphatic hydrocarbon radical, or an aromatic or cycloaliphatic nucleus, preferably substituted with alkyl groups, and
R' is the moiety of a saturated or unsaturated alcohol; a phenol optionally substituted with alkyl radicals; a cyclic lactam; an aldoxime, a ketoxime; an acetoacetic acid ester, or a hydroxamic acid ester.

The coatings can optionally include pigments, dyestuffs, extenders, solvents, paint additives, and additional cross-linking components. The coatings of the present invention have better throwing power, which means that the deposition of the paint is greatly enhanced on areas remote or shielded from the anode with respect to the coating systems of Ser. No. 878,772. Furthermore, sensitivity to still clinging aqueous paint or rinse water, or impurities of the deposited dry film is considerably reduced, which in turn leads to excellent cured films. Another advantage of the same coating is enhancement of the corrosion resistance of the coatings.

Binder systems particularly suitable for the modification according to the present invention are those which include more than one macromolecular component with at least one component carrying basic groups. Preferably, however, all of the main components will carry basic groups. At least one of the components will carry acid groups. A variety of raw materials are known which can be used to synthesize the macromolecules carrying the basic groups. The following includes a description of various methods of synthesizing the macromolecules which is exemplary and not complete A preferred group of macromolecules with basic nitrogen atoms is formed by addition reaction of epoxy compounds with secondary amines. Illustrative epoxy group containing raw materials having in common the general formula

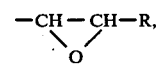

wherein R is H or alkyl
are glycidyl ethers of phenols, particularly of 4,4'-bis(-hydroxyphenyl)propane (Bisphenol A); glycidyl ethers of phenol formaldehyde condensates of the Novolak type; glycidyl esters of aliphatic, aromatic, or cycloaliphatic mono- or polycarboxylic acids; glycidyl ethers of aliphatic or cycloaliphatic diols or polyols; copolymers of glycidyl(meth)acrylate, and epoxidation products of aliphatic or cycloaliphatic di- or polyolefins. A more complete survey of epoxy group containing raw materials is found in A. M. Paquin "Epoxidverbindungen und Epoxyharze," Springer 1958. Secondary amines suitable for addition to the epoxy group containing raw materials include dimethylamine, diethylamine or higher homologues or isomers thereof. Secondary alkanol amines are particularly suited, including diethanolamine, diisopropanolamine, or higher homologues or isomers thereof. Cyclic secondary amines such as ethylene imine, morpholine, and piperidine can also be employed. The reaction of the epoxides with primary/tertiary or secondary/secondary diamines leads to compounds with cationic character. It is evident that the epoxy compounds can be modified with other compounds such as mono- or dicarboxylic acids. It is essential that the products carry a sufficient number of basic groups to enable acceptable dilution with water upon partial neutralization with acids.

Macromolecules with basic nitrogen atoms are also obtained through copolymerization of suitable basic monomers with hydroxyalkyl(meth)acrylates, preferably in the presence of other copolymerizable compounds. Such basic monomers include the (meth)acrylates, such as N,N-dimethylaminoethyl(meth)acrylate; vinyl piridine; N-vinylimidazol, and N-vinylcarbazol. The basic group containing monomers can be copolymerized with other monomers including hydroxyalkyl(meth)acrylates; other (meth)acrylates, i.e., those not containing basic nitrogen groups; (meth)acrylamides; vinyl aromatics such as styrene, vinyltoluol, and alpha-methyl styrene.

A further group of macromolecules with basic nitrogen atoms are the substituted oxazolines including those obtained by the cyclizing condensation of amine alcohols, such as trishydroxymethyl aminomethane or 2-amino-2-hydroxymethyl-1,3-propanediol, with aliphatic carboxylic acids or carboxy group containing macromolecules. A comprehensive survey of useful oxazolines is set forth by J. A. Frump, *Chemical Review,* 1971, Vol. 71, No. 5, pp. 483–505. Polyesters with the substituted oxazoline groups are disclosed in U.S. Pat. No. 3,882,188 and in British Pat. No. 1,411,568.

A further group of macromolecules with basic nitrogen atoms is obtained by addition reaction of anhydride groups containing compounds with alkanol amines, particularly with dialkylalkanolamines, e.g. dimethyl- or diethylethanolamine. The addition reaction is carried out at from 50° to 150° C., preferably 90°–120° C., with semi-ester formation. Suitable starting materials are succinic anhydride derivatives or Diels-Alder adducts as can, for example, be obtained by addition of maleic anhydride to compounds with isolated or conjugated double bonds. Among this group are, for example, adducts of maleic anhydride to unsaturated oils and fatty acids, and rosin acids to diene polymers, unsaturated hydrocarbon resins, and the like. Furthermore, copolymers carrying anhydride structures, such as styrene-maleic anhydride copolymers, can be employed. Nitrogen groups can also be introduced into the macromolecule by the reaction of acid anhydride groups or semiesters thereof with diamines carrying one primary and one tertiary nitrogen atom and is a particularly favorable method where one of the components includes a macromolecule into which the basic groups are introduced through condensation of dicarboxylic acid anhydrides with primary/tertiary diamines, with the formation of water. Suitable starting materials are the succinic anhydride derivatives above noted or Diels-Alder adducts or copolymers. Oligomeric liquid polymers of dienes are particularly preferred for adduct formation, especially of 1,3-butadiene. The quantity of added dicarboxylic anhydride usually lies between 10 to 25 percent by weight. The adduct anhydrides are as mentioned partially reacted with primary/tertiary diamines with water being formed and thereby introducing tertiary basic nitrogen atoms in addition to amide and imide groups. The quantity of diamine compound is chosen in order that for one mole of anhydride group about 0.3–0.8 moles of diamine are used. A residual quantity of carboxy groups is provided as a precaution, which subsequently is set free from the latent form of the residual anhydride groups through reaction with water or monoalcohols. Examples of suitable diamines are dimethylaminoethylamine, diethylaminoethylamine, dimethylaminopropylamine, diethylaminopropylamine and homologues thereof. The diamine is added at between 50° C. and 180° C. The reaction is finished at between 160° and 220°0 C., the formation of the preferred acid imide group being traceable with the quantity of the water formed or with magnetic nucleus resonance spectroscopy. At lower reaction temperatures the formation of an acid amide group is traceable only by nucleus resonance measurement. The further component of this particularly favorable method preferably are reaction products of epoxy group containing compounds, particularly of polyglycidyl ethers of polyvalent phenols, such as Bisphenol A, or of Novolak resins with secondary amines. Suitable epoxy compounds also are polymers carrying epoxy groups, based on dienes or acrylic copolymers. In addition to the secondary aliphatic or cycloaliphatic amines generally used, a derivative of diethylene triamine can be used, both primary amino functions of which are masked through ketoimine formation with at least 2 moles of ketone. The addition of the secondary amine or alkanolamine to the epoxy resin is carried out at a temperature between 30° to 150° C., and is generally an exothermic reaction. In case of the preferred epoxy resins melting at higher temperatures, it is advantageous to coemploy solvents inert to the epoxy groups, secondary amines, and hydroxy groups. Such solvents include ketones, such as methylethylketone and methylisobutylketone; esters, such as ethylacetate, butylacetate, and ethylglycol acetate; ethers, such as tetrahydrofurane, ethylene glycol diethyl ether, and the like. The quantity of secondary amine or alkanol amine is chosen in order that the reaction product has an amine number of between 35 and 120 mg KOH/g. In general this value is attained, even if not all epoxy groups are consumed, in the reaction with the amine compound. In this case it is of advantage to esterify the remaining hydroxy groups with saturated or unsaturated carboxylic acids. In copending application Ser. No. 816,937 deposited July 19, 1977, methods of introducing basic groups into macromolecules by reacting hydroxy or carboxy group containing compounds with basic monoisocyanates are described.

Various methods are known for introducing acid groups into the binder system. It is possible to admix a suitable quantity of a macromolecular compound carrying acid groups with a basic resin. Alternatively, a chemical combination between the basic and acid components can be effected through reaction of an acidic macromolecular compound, or an intermediate compound, with a basic resin. The acid compounds used according to this method are prepared in a separate reaction step. A preferred group of macromolecular compounds are the addition compounds obtained through reaction of alpha,beta-unsaturated dicarboxylic acids or anhydrides with compounds having isolated or conjugated double bonds (adducts). In case of adduct formation with anhydrides, it is necessary to open the anhydride ring with water or alcohols and to thereby set free the carboxy groups. Starting materials for such adducts are unsaturated oil fatty acids, synthetic or natural hydroxy-free esters, mixed esters thereof with rosin acids, as well as diene polymers or hydrocarbon resins.

A still further group of macromolecular compounds with acidic character are the conventional polyesters or alkyd resins selected to carry a sufficient number of free carboxy groups. The required acidic character is achieved either by interrupting the esterification at the desired acid value or by the formation of partial esters of di- or polycarboxylic acids with hydroxy-rich polyesters with low acid values. Furthermore, according to the present invention, copolymers can be coemployed which carry free carboxy groups. The preferred copolymers are those with acrylic or vinylaromatic structures, e.g., copolymers of acrylates, styrene, acrylic acid, methacrylic acid, maleic acid derivatives, etc.

The acid components, in addition to the essential acid groups, may contain other functional groups, such as hydroxyl groups, amide groups, imine groups and amine groups. If these additional groups are of basic nature, they must be considered when calculating the desired ratio in the binder of the basic and acid groups.

The ratio between the basic and acid groups in the binder system is expressed as the ratio between amine number and acid number (mg KOH/g). The coating compositions of the invention are based on binders wherein such ratio is between 97:3 and 65:35.

The modification of at least one of the components constituting the total binder is carried out by reaction with a compound of the general formula OCN—R$\{$NH—CO—R'$]_n$ wherein:

n is 1–3;

R is an aliphatic hydrocarbon radical or an aromatic or cycloaliphatic nucleus, preferably substituted with alkyl groups, and R' is a radical, reduced by one reactive hydrogen atom, of a saturated or unsaturated alcohol, or a phenol, an alkyl substituted phenol, or a cyclic lactam or an aldoxime or ketoxime or an aceto acetic acid ester or a hydroxamic acid ester.

These compounds are partially masked polyisocyanates obtained through reaction of polyisocyanates, preferably polyisocyanates carrying isocyanate groups with different reactivity, with a blocking agent. 2,4-toluylene diisocyanate is preferably used, one of the isocyanate groups being blocked with monoalcohols, phenols, oximes, lactams, or acetic acid esters. The blocking agents may also carry polymerizable double bonds, for example the blocking agent can be a mono-hydroxyacrylate. These partially masked polyisocyanates contain an average of one free isocyanate group.

The reaction of the partially masked polyisocyanate with one of the components of the coating composition is carried out at from 60° to 160° C., optionally in the presence of a solvent inert to isocyanates, and is carried on until the free isocyanate groups are substantially consumed. The highest applicable reaction temperature is governed by the nature of the masking agent. The progress of the reaction is reflected in the decreasing isocyanate content, optionally also the decreasing acid value, the acid value becoming constant in a range of from 5 to 46 mg KOH/g at the end of the reaction. The amine number of the reaction product is from 25 to 70 mg KOH/g. For easier handling, the components subsequent to the reaction with the partially masked polyisocyanate, may be diluted with solvents. Suitable solvents are the low glycol ethers, such as ethylene glycol monoethylether, ethyleneglycolmonoisopropylether, and ethyleneglycolmonobutylether. Other suitable solvents are alcohols such as ethanol, propanol, isopropanol, butanol, and the like. Another possiblity is the neutralization with acids and dilution with water. Suitable acids are mainly monobasic low molecular weight organic acids such as formic acid, acetic acid, lactic acid, and the like.

It has been determined that at times it may be advantageous with regard to the corrosion resistance with respect to salt solutions of the coatings to enhance the hardening tendency of the coating compositions through the introduction of an additional crosslinking component. Suitable crosslinking agents are urea-melamine or phenol-formaldehyde condensates particularly of the resol type. They are prepared according to known methods by alkaline condensation of formaldehyde and substances splitting off formaldehyde to urea, melamine, benzoguanamine, acetoguanamine, phenol, cresol, p-tert.butyl phenol, Bisphenol A, and the like. The methylol compounds may optionally be etherified with alcohols. Particularly preferred is the use of a phenol-formaldehyde condensate, the phenolic hydroxy groups of which are etherified with allyl alcohol. The amount of these crosslinking agents employed may range between 3 and 20 percent of the total binder. Since the crosslinking agents are in most cases not directly water soluble, they are co-reacted with at least one of the binder components through careful condensation. The extent of this reaction is carried to an excellent water solubility of the reaction mass upon neutralization with low molecular organic acids. The temperatures required in general for this purpose range from 60° to 120° C., and the reaction time ranges from 1 to 6 hours. Additional cross-linking agents are completely masked polyisocyanate compounds. In constitution they are equal to the above-described partially masked polyisocyanate compounds, with the exception that they do not carry a free isocyanate group.

The preparation of the binders of the present invention is carried out either by mixing the components at temperatures which safeguard excellent homogenization or by partial reaction between the various components at temperatures of up to 200° C., preferably up to 100° C., safeguarding satisfactory dilutability in water of the product. Mixing and reaction is conveniently effected in water-tolerant solvents such as alcohols, glycol ethers, ketones, or ketone alcohols.

The binder system or the single components may be processed together with pigments, extenders, anticorrosion pigments, and optionally paint additives or crosslinking catalysts to provide coacting compositions suitable for the desired industrial application. Useful color pigments include titanium dioxide, carbon black, iron oxides, and phthalo-cyanines. Anti-corrosion pigments include lead silicate, lead oxide, lead chromate, lead silico-chromate, and strontium chromate. Normally used extenders are aluminum silicate, talcum, barium sulfate, highly dispersed diatomaceous earth, and the like.

The basic nitrogen atoms of the binders of the present invention are neutralized partially or totally with organic and/or inorganic acids. The degree of neutralization depends on the individual binder system. In general that much acid is added which gives a coating composition which in its form of application at a pH-value of from 4 to 9, preferably 5 to 7, is water dilutable or dispersable. The concentration of the binder in water lies in the range of 3 to 30 percent by weight, preferably 5 to 15 percent by weight.

On deposition the aqueous coating composition containing the binder of the invention is wired to an electrically conductive anode and an electrically conductive cathode, the surface of the cathode being coated with the coating composition. A variety of chemically conductive substrates may be coated, in particular, metallic substrates including steel, aluminum, copper, and the like, but also metallized plastics or other materials covered with a conductive coat. After deposition, the coating is optionally rinsed with water and cured at elevated temperature. For curing, temperatures of from 130° to 220° C., preferably 150° to 190° C., are employed. The curing time ranges from about 5 to 30 minutes, preferably 10 to 25 minutes.

The following examples are for illustrative purposes and are not to be construed as limiting the scope of the invention. Parts are by weight unless otherwise designated.

Preparation Of Partial Components A

For abbreviations and quantities, see the key to, and Table 1.

The unsaturated oil is mixed with inhibitors 6, 7 and heated together with maleic anhydride to 200° C. while stirring, and is reacted at this temperature until no free maleic anhydride can be traced. Upon cooling to 150° C., inhibitor 8 and the amine are slowly added while refluxing. The batch is reheated to 200° C., the reaction water being distilled off. Upon cooling to 120° C., the bath is diluted with AEGLAC (a) and the remaining anhydride structures are opened at 90° to 100° C. with the compounds listed as 11. After further dilution with AEGLAC (b) catalyst 12 is added, and, at 60° to 120° C., the urethane compound (U1-U4) is added. The reaction is carried on until the listed acid value is reached.

For partial components A6 and A7, an adduct compound only is prepared, the anhydride groups of which are opened with water or by esterification with alcohols.

Determination Of The NCO-Value

About 2 g of the sample are accurately weighed into a dry Erlenmeyer flask and dissolved in toluol with gentle heating. Exactly 10 ml of reaction solution (prepared through dissolution of 0.5 moles of diisobutylamine in 940 m of toluol) is added with a pipette. After 3 minutes of reaction time at room temperature a few drops of bromophenolblue indicator (methanol solution) are added and the sample is titrated with 0.5 n alcoholic HCl until the color turns yellow. A blank test is made the same way.

B = consumption 0.5 n HCl for blank test
V = consumption 0.5 n HCl of sample
A = theoretical consumption of 0.5 n HCl for neutralization of the basicity of the resin
E = weigh-out in g

TABLE 1

Composition And Specification Of Partial Components A

|  |  | A1 | A2 | A3 | A4 | A5 | A6 | A7 |
|---|---|---|---|---|---|---|---|---|
| Linseed oil |  | 400 | — | — | 200 | — | — | 500 |
| Polybutadiene | (1) | — | 500 | — | — | — | — | — |
| Polybutadiene | (2) | — | — | 380 | — | — | — | — |
| Polybutadiene | (3) | — | — | — | — | 400 | — | — |
| Polybutadiene | (4) | — | — | — | — | — | 400 | — |
| Polypentadiene | (5) | — | — | — | 200 | — | — | — |
| Inhibitor | (6) | 0.1 | 0.1 | 0.1 | 0.1 | 0.1 | — | — |
| Inhibitor | (7) | — | — | — | — | — | 4 | 5 |
| Maleic anhydride |  | 100 | 100 | 100 | 100 | 100 | 100 | 100 |
| Inhibitor | (8) | 0.2 | 0.25 | 0.19 | 0.2 | 0.2 | — | — |
| N,N-Diethylamino-propylamine |  | 65 | — | 78 | 65 | 26 | — | — |
| N,N-Dimethylamino propylamine |  | — | 68 | — | — | — | — | — |
| DIAC | (9) | — | — | — | — | — | 50 | — |
| AEGLAC (a) | (10) | 62 | 166 | 140 | 62 | 134 | — | — |
| H$_2$O distilled | (11) | — | — | — | — | 14 | — | 20 |
| Methanol | (11) | 15 | 10 | — | 15 | — | 30 | — |
| n-Butanol | (11) | — | — | 30 | — | — | — | — |
| AEGLAC (b) | (10) | 318 | 183 | — | 318 | 224 | — | — |
| Isopropanol |  | — | — | — | — | — | 170 | 150 |
| Catalyst | (12) | 0.74 | 0.7 | 0.65 | 0.74 | 0.7 | — | — |
| U1 | (13) | 195 | — | — | 195 | — | — | — |
| U2 | (13) | — | 253 | — | — | — | — | — |
| U3 | (13) | — | — | 110 | — | — | — | — |
| U4 | (13) | — | — | — | — | 253 | — | — |
| Solvent for adjustment of solids content | (14) | — | AEGL | AEGL | — | — | — | — |
| Amine value mg KOH/g |  | 45 | 50 | 53 | 45 | 16 | — | — |
| Acid value mg KOH/g |  | 19.4 | 15 | 18 | 19.4 | 90 | 90 | 150 |
| Solids content Percent by weight |  | 60 | 60 | 55 | 60 | 60 | 70 | 80 |

Key to Table 1
(1) liquid butadiene homopolymer, viscosity: 900 mPa.s (45° C.); microstructure: 90% 1,2-vinyl-double bonds;
(2) liquid butadiene homopolymer, average molecular weight ca. 1500, viscosity: 700 mPa.s (25° C.); microstructure: 20% 1,2-vinyl-, 40% 1,4-trans-, 40% 1,4-cis-double bonds;
(3) liquid butadiene homopolymer, viscosity: 800 mPa.s (20° C.), iodine number: 450; microstructure: 70% 1,4-cis-, 28% 1,4-trans-double bonds;
(4) liquid butadine homopolymer, average molecular weight ca. 1400, microstructure: 75% 1,4-cis-, 25% 1,4-trans-double bonds;
(5) liquid poly-1,3-pentadiene, average molecular weight ca. 1000; viscosity: 30,000 mPa.s (30° C.)
(6) N,N'-diphenyl-p-phenylenediamine
(7) Cu-naphthenate (9% metal content)
(8) 2,6-di-tert. butyl-4-methylphenol
(9) diacetonealcohol
(10) ethyleneglycolmonoethyletheracetate
(11) reactants for opening the anhydride structures
(12) stannous dibutyldilaurate
(13) urethane compound
U1: 174 g tolylenediisocyanate are reacted at 60° C. with 60 g isopropanol in 156 g AEGLAC until an NCO-value of 18 is reached.
U2: In the presence of 0.3 g of catalyst (12) and 203 g of water-free AEGLAC, 174 g of tolylenediisocyanate are reacted at 120° C. with 130 g of ethylacetoacetate until an NCO-value of 16 is reached.
U3: 174 g of tolylenediisocyanate are reacted with 113 g ε-caprolactame at 60° C., in 191 g of AEGLAC, until an NCO-value of 15 is reached.
U4: 174 g of tolylenediisocyanate are reacted with 130 g of 2-ethylhexanol in 203 g of AEGLAC at 60° C., until an NCO-value of 14 is reached.
(14) AEGL: ethyleneglycol monoethylether $$\text{NCO-value} = (B - V + A)/E$$

Partial Component B1

950 g of a commercially available bisphenolglycidyl ether with an epoxy equivalent weight of 950–1000 are heated with 192 g ethylglycol acetate to 100° C., while stirring and held, until a homogeneous solution is formed. Then 98 g tall oil fatty acids and 1 g of triethyl amine are added and the batch is heated to 130° C., until the acid value is below 1 mg KOH/g. At 100° C., 44 g of diethylamine are slowly added while refluxing. The batch is reheated to 130° C. and stirred for another hour at this temperature. The viscosity of a solution of 55 g of reaction mass and 45 g of ethylglycol is N, Gardner. The batch is diluted with 45 g of ethyl glycol. At 80° C., 186 g of a bisphenol-resin, 65%, is added which is prepared through alkaline condensation of 1 mole bisphenol and 4 moles of formaldehyde. After 5 hours of reaction time at 80° C., the batch is diluted with ethyl glycol to a total solids content of 70 percent. The amine value of the non-volatile portion is 28 mg KOH/g, the viscosity of a solution of 10 parts by weight of reaction product and 5 parts by weight of ethyl glycol is K, Gardner.

Partial Component B2

475 g of an available bisphenol glycidylether with an epoxy equivalent weight of 450–500 are dissolved homogeneously in 96 g of ethylglycol acetate at 100° C., while stirring. Then 22 g of acrylic acid, 0.022 g of hydroquinone and 1 g of triethylamine are added and reacted at 130° C., until an acid value of 1 mg KOH/g is reached. At 100° C. 52 g of diethanol amine are added and the batch is held at 130° C. for 1 hour. The batch is diluted with ethylglycolacetate to a solids content of 78 percent and is reacted at 80° C. for 5 hours with 61 g of methylolphenolallyl ether (viscosity 30 Poise at 25° C.). The batch is further diluted to 60 percent solids with ethyl glycol acetate and at 60° C. 217 g of the urethane compound described below are added, together with 0.74 g of stannous dibutyldilaurate. The reaction is carried out at 80° C. until an NCO-value of zero is attained. The reaction product has a solids content of 60 percent and the amine value is 38 mg KOH/g (DIN 53 176) for the non-volatile portion. The urethane compound used in this reaction was prepared from 174 g of tolylene diisocyanate (isomer blend) and 87 g methylethylketoxime and 174 g of ethylglycolacetate, the oxime being added at 30° C. and the reaction being finalized at 60° C., until an NCO-value of 17 is attained.

Partial Component B3

103 g of diethylene triamine and 220 g of methylisobutylketone are heated to boiling temperature in a reaction flask equipped with reflux condensor and water separator, until about 36 ml of water have separated. After distillation of the surplus ketone, about 270 g of the diketimine of diethylene triamine are obtained.

In another reaction vessel equipped with stirrer and thermometer, 475 g of bisphenolglycidyl ether having an epoxy equivalent weight of 450–500 are dissolved homogeneously at 100° C. in 126 g of ethylglycol acetate. Then 140 g of dehydrated castor oil fatty acid and 1 g triethyl amine are added and retracted at 120° C., until the acid value has fallen below 1 mg KOH/g. At 90° C., 123 g of the above-noted ketimine are added and the batch is heated to 130° C. A sample of the reaction mass, with a little butylglycol and acetic acid, is clearly soluble in water. The viscosity of a solution of 4 g of reaction mass and 6 g ethylglycol is L, Gardner. The batch is cooled to 90° C. and 32 g water and 100 g of ethylglycol are added. A resin solution with 70 percent solids content is obtained. The amine value of the non-volatile portion is about 80 mg KOH/g.

Partial Component B4

500 g of linseed oil is reacted with 100 g maleic anhydride at 200° C. in the presence of 5 g of a copper naphthenate solution with 9 percent Cu, until the content of free maleic anhydride has fallen below 1 percent. The viscosity of a solution of 80 g of adduct and 40 g of ethylene glycol monoethyl ether acetate is about 50 seconds (DIN 53 211) and the acid value is 170 mg KOH/g. At 150° C., 130 g of diethylaminopropylamine are added within one hour and the batch is held at 180° C., until the total quantity of amine has reacted. After cooling to 120° C., the solids content is adjusted to 80 percent with 175 g of ethylene glycolmonoethyl ether. (Amine number: 80 mg KOH/g)

EXAMPLES 1–7

The partial components are blended as listed in Table 2. The quantities refer to resin solids.

TABLE 2

|  | Partial Components |  |  |  | Ratio |  |
|---|---|---|---|---|---|---|
|  |  |  |  |  | Amine Value | Acid Value |
| Example 1 | 50 | A1 | 50 | B1 | 79 | 21 |
| Example 2 | 60 | A2 | 40 | B3 | 89 | 11 |
| Example 3 | 40 | A3 | 60 | B2 | 85 | 15 |
| Example 4 | 30 | A4 | 70 | B3 | 92 | 8 |
| Example 5 Comparison | 20 | A5 | 80 | B4 | 79 | 21 |
| Example 6 | 20 | A6 | 80 | B4 | 78 | 22 |
| Example 7 | 10 | A7 | 90 | B2 | 70 | 30 |

EXAMPLE 8

At reflux temperature, 238 g of dimethylaminomethylmethacrylate, 24 g of acrylic acid, 410 g of 2-ethylhexylacrylate, 340 g of styrene are copolymerized in 1000 g of ethylglycol acetate in the presence of 20 g of dodecylmerkaptan and 20 g of azodiisobutyronitrile, until the solids content has reached 48.4 percent. The amine value of the copolymer, on resin solids, is about 84 mg KOH/g, the acid value about 18 mg KOH/g.

At 80° C., 124 g of the urethane compound described below are added and the charge held at 80° C. until the NCO-value has attained zero and the resin solution has become water dilutable upon neutralization with acids. The solids content of the resin solution is 51 percent, the amine value of the resin solids is about 75 mg KOH/g, the acid value about 8 mg KOH/g (base-acid ratio 90:10 mg KOH/g).

The urethane compound used in this reaction was prepared from 222 g isophorone diisocyanate and 130 g beta-hydroxyethylmethacrylate, in the presence of 1.3 g of hydroquinone, by reaction at 80° C. until the NCO-value was 12.

Evaluation Of The Binders

Each 100 g of the listed binders based on resin solids were mixed with the required quantity of acid and, while stirring, made up to 1000 g with deionized water. From a 10 percent solution, steel panels wired at the cathode of an electrodeposition system were coated electrophoretically. The deposition time was 60 seconds in all cases. The coated substrates were rinsed with deionized water and cured at elevated temperature. The average film thickness of the cured films was from 13 to 17 μm. Table 2 gives the compiled results.

TABLE 3

| | Neutralization | | | Deposition | | | | Evaluation | | Throwing |
| | Quantity (1) | Type (2) | pH (3) | Volt | Cure Min/°C. | Hardness (4) | Indentation (5) | Resistance | | Power (cm) (8) |
| | | | | | | | | (6) | (7) | |
| --- | --- | --- | --- | --- | --- | --- | --- | --- | --- | --- |
| 1 | 3.4 | M | 6.3 | 270 | 30/200 | 200 | 8.5 | 800 | 500 | 18.8 |
| 2 | 1.2 | A | 6.5 | 300 | 20/180 | 180 | 8.0 | 600 | 450 | 19.2 |
| 3 | 3.0 | E | 6.0 | 270 | 20/160 | 150 | 8.2 | 1000 | 500 | 17.3 |
| 4 | 2.9 | A | 5.8 | 230 | 20/170 | 170 | 6.5 | 500 | 450 | 16.2 |
| 5 | 6.8 | M | 5.5 | 260 | 30/190 | 180 | 7.3 | 800 | 500 | 16.0 |
| 6 | 6.8 | E | 6.0 | 230 | 20/180 | 175 | 7.9 | 480 | 360 | 13.0 |
| 7 | 3.8 | E | 5.6 | 260 | 30/190 | 190 | 7.4 | 700 | 420 | 17.1 |
| 8 | 6.8 | M | 5.6 | 280 | 30/180 | 175 | 7.7 | 800 | 400 | 15.5 |

Key to Table 3
(1) Quantity of acid in g for 100 g resin solids
(2) E is acetic acid (80%, aqueous) M is lactic acid (80%, aqueous) A is formic acid (80%, aqueous)
(3) measured on a 10% aqueous solution
(4) Konig pendulum hardness, DIN 53 157 (seconds)
(5) Erichsen indentation DIN 53 156 (mm)
(6) hours of water soak at 40° C. until blistering and corrosion become visible
(7) ASTM-B-117-64 salt spray: 2 mm of corrosion at the cross incision after the recorded hours
For this test degreased non-pretreated steel panels were coated with a pigmented paint containing 100 parts by weight of resin solids, 20 parts by weight of aluminum silicate pigment, and 2 parts by weight of carbon black.
(8) Determination of Throwing Power:
A plastic cylinder of 400 mm height and 60 mm diameter is filled with 1 liter of paint. At a distance of about 1 mm from the bottom of the cylinder a steel disc having a diameter of 53 mm is mounted as an anode. The cathode is a square hollow bar with dimensions as follows: 300 mm length and 10 mm of clear width, having fixed inside in diagonal position a steel strip of 300 × 14 × 3 mm. The cathode is immersed into the paint to a length of 270 mm. Paint temperature is 25° C. During deposition it should not rise by more than 1 or 2° C. Deposition is carried out with constant voltage during 3 minutes. The deposition voltage is chosen in order that substantially no over-deposition is effected at the outside of the cathode square. After deposition the steel strip is removed from the cathode and rinsed with tap water. The film is cured in an air circulation oven for 30 minutes at 180° C. The visible length of deposition on the strip is recorded.

Various modifications can be made in the aforesaid examples and still fall within the scope of the present invention. It is only essential that at least one resin component of the binder system be reacted with the select monoisocyanate through a reactive group on the resin component in an amount sufficient to improve the throwing power and/or corrosion resistance of a coating composition containing the binder. The actual amount based on the illustrative examples will be selected depending upon the materials employed and the end application of the coating system.

It is claimed:

1. Cathodically depositable water dilutable coating compositions comprising a binder system including at least one macromolecular component, the macromolecular component or components of the binder system containing basic nitrogen groups and acid groups, the ratio of basic groups to acid groups as expressed by the ratio of amine value to acid value, in mg KOH/g, being between 97:3 and 65:35, and a macromolecular component of said binder system being reacted with a monoisocyanate compound having the formula OCN—R$[$NH—CO—R'$]_n$ wherein:
n is 1–3;
R is an aliphatic hydrocarbon radical, or an aromatic or cycloaliphatic nucleus, and
R' is the moiety of a saturated or unsaturated alcohol; a phenol; a cyclic lactam; an aldoxime, a ketoxime; an acetoacetic acid ester, or a hydroxamic acid ester.

2. The coating composition of claim 1 wherein the binder system includes in admixture at least two macromolecular components with one of said macromolecular components containing basic nitrogen groups and a second macromolecular component containing acid groups.

3. The coating composition of claim 1 wherein the binder system includes a macromolecular component containing both acid and basic groups.

4. The coating composition of claim 1 wherein the binder system includes a reaction product of a basic macromolecular component and an acid macromolecular component.

5. The coating composition of claim 2 wherein the macromolecular component with acid groups contains reactive functional groups in addition to the acid groups.

6. The coating composition of claim 5 wherein said additional functional groups are hydroxyl or amine groups.

7. The coating composition of claim 3 wherein said macromolecular component contains the basic and acid groups in one resin molecule in the stated ratio and is further reacted with said monoisocyanate component.

8. The coating composition of claim 1 wherein said macromolecular component with basic nitrogen groups is the reaction product of an epoxy compound and a secondary amine.

9. The coating composition of claim 1 wherein the macromolecular component containing basic nitrogen atoms is the copolymer of a basic monomer containing ethylenically unsaturated units and a hydroxyalkyl(meth)acrylate.

10. The coating composition of claim 9 wherein the basic monomer is a member of the group consisting of N,N-dimethylaminoethyl(meth)acrylate; vinyl piridine; N-vinylimidzol, and N-vinylcarbazol.

11. The coating composition of claim 10 wherein the copolymer includes a member of the group consisting of (meth)acrylamide, styrene, vinyltoluol, and alpha-methyl styrene.

12. The coating composition of claim 1 wherein the macromolecular component is the reaction product of an anhydride group containing compound with an alkanolamine.

13. The coating composition of claim 1 wherein the acid groups are on a macromolecular component which is the reaction product of an alpha,beta-unsaturated dicarboxylic acid or anhydride with a compound having isolated or conjugated double bonds.

14. The coating composition of claim 1 wherein the acid groups are on a macromolecular polyester.

15. The coating composition of claim 1 including additional cross-linking agents.

16. The coating composition of claim 15 wherein the additional crosslinking agent is a phenol-formaldehyde condensate of the resol-type.

17. The coating composition of claim 1 wherein the said phenol is substituted with an alkyl group.

* * * * *